United States Patent Office 3,503,955
Patented Mar. 31, 1970

3,503,955
PHENYL-AZO-PHENYL DYESTUFFS
Guido R. Genta, Lock Haven, Pa., assignor to American Aniline Products, Inc., a corporation of Delaware
No Drawing. Continuation-in-part of application Ser. No. 567,862, July 26, 1966. This application June 13, 1967, Ser. No. 645,626
Int. Cl. C09b 24/26
U.S. Cl. 260—207                                    7 Claims

ABSTRACT OF THE DISCLOSURE

Monazo dyestuffs are prepared by coupling a diazotized arylamine, such as 2,4 - dinitro-6-bromoaniline, into a tertiary amine coupling component derived from a N,N-dihydroxyalkylacetanilide, such as 3-N,N-dihydroxyethylacetanilide. The hydroxyalkyl groups of the coupling component are modified by reaction either before or after the coupling reaction both with (1) a mono- or di-lower alkylformamide or acetamide and (2) a strong acid i.e. an alkylchlorocarbonate, acylhalide, sulfonylchloride or thionylchloride. The dyestuffs prepared by the method of the invention produce dyeings in polyester fibers having excellent substantivity and sublimation fastness and good light fastness.

Cross reference to related application

This application is a continuation-in-part of my application Ser. No. 567,862, filed July 26, 1966, and now abandoned.

Background of the invention

In recent years there has been a considerable effort by the dyestuffs industry to find suitable materials for coloring aromatic polyester fibers. These fibers, which have outstanding utility as textile materials, are made, for example, by heating a glycol of the formula $HO(CH_2)_nOH$, wherein $n$ is an integer greater than one, but not exceeding ten, with isophthalic or terephthalic acid or with an ester forming derivative thereof, for example, an aliphatic or aryl ester or half ester, an acid halide or an ammonium or an amine salt, under conditions at which polycondensation is effected. Of these polyesters, polyethylene terephthalate, or "Dacron," has made remarkable impact on the textile industry.

In the continuous dyeing of such fibers, serious problems exist in getting sufficient padding liquor on the fibers along with sufficient dye, and in accelerating the rate of diffusion of the dye inside the fiber. It is of great importance that the goods should take up as much dye liquor as possible and that the rate of diffusion and, consequently, the speed of fixation of the dye should be as high as possible.

Polyesters are conventionally dyed by solvent-dyeing methods, disperse-dyeing methods, or by thermo-fixation methods, such as the THERMOSOL process. This process, which involves the use of controlled heat, such as hot air or heated contact rolls, is conveniently used for dyeing polyester and polyamide fibers and mixtures containing these fibers. Temperatures of 180–220° C. (ca. 360–425° F.) are used for thirty to ninety seconds. If the fabric contains cotton or viscose rayon, apart from synthetic fibers, there is no danger of damaging cellulosic portions, but if wool is present, the temperature must be kept within 180–200° C. and the time must be reduced to 30 seconds.

The use of tertiary amine coupling components containing two hydroxyalkyl groups in the preparation of dyes has been known for many years, but such dyes have no value as colors for polyester fibers. In recent years considerable attention has been directed to the modification of the hydroxyalkyl substituents to provide new colors that have good affinity for polyester fiber. One such modification is to prepare the diacetoxy compound by acylation with acetyl chloride, cf. U.S. Patent 3,178,-405. Unfortunately, as the size of the molecule is increased by a change in acylating agent, the effectiveness of the product dyestuff as a polyester color diminishes rapidly. One serious problem encountered in connection with dyestuffs of this type is in the ability of the product to build up on the fiber in an amount proportional to the amount of dye applied by carrier dyeing methods. Most acylating agents, other than acetyl chloride, provide dyes which will not build on the fiber regardless of the amount of dye used in the dye bath. Such dyes are unfortunately unsuitable for use in textile mills, since the desired strength of color cannot be obtained.

I have discovered that the poor properties of such products result in part from the presence of substantial amounts of unreacted dihydroxyalkyl component in the final product. In my co-pending application, Ser. No. 567,829, filed July 26, 1966 and now abandoned, I have disclosed and claimed a novel modification of the dihydroxyalkyl groups using an alkyl chlorocarbonate, such as ethyl chlorocarbonate. I have found that if one uses acylating agents other than acetyl chloride it is ordinarily impossible to obtain a final dyestuff mixture free of unreacted dihydroxyalkyl compound, regardless of the amount of acylating agent used in an effort to complete the reaction. In the preparation of the novel dyestuffs of my co-pending application, I have eliminated the undesirable dihydroxyalkyl compound by the use of a tertiary amine acid-binding agent which does not couple with the coupling component or serve to acylate the free hydroxyl groups. Although the use of the acid-binding agent substantially eliminates dihydroxyalkyl compounds, the reaction does not actually proceed to completion, since there remains a measurable amount of monohydroxyalkyl material.

I have discovered a new class of water-insoluble mono-azo dyestuffs which have remarkable affinity for aromatic polyester fibers and which can be dyed by carrier dyeing methods to achieve a build-up on the fiber that is proportional to the amount of dye applied. Surprisingly, my new dyestuffs possess greater dyeing strength than that of the known monoazo dyes. In addition, my new dyes have good light fastness, excellent sublimation characteristics, and preserve wool and cotton in blended fabrics.

Summary of the invention

The present invention represents a further improvement over the method of my co-pending application, Ser. No. 567,829 in that I am able to modify the hydroxy alkyl groups of a tertiary amine coupling component; i.e., a 3-N,N-dihydroxyalkylacetanilide by reacting these groups both with (1) a strong carboxylic acid halide such as an alkylchlorocarbonate, acyl halide, sulfonylchloride and thionylchloride, and (2) a mono- or di-lower alkylformamide, e.g., N,N-dimethylformamide.

In accordance with my invention, a monoazo dyestuff is provided which consists essentially of the reaction product of:
(a) a diazotized arylamine of the formula:

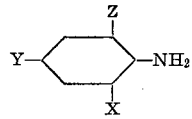

wherein X is $NO_2$, halogen, H, $SO_2$alkyl, $SO_2NH_2$, $CONH_2$, COalkyl, CN, or $CF_3$; Y is $NO_2$ or CN; Z is X or Cl, Br, $NO_2$ or CN, and (b) a coupling component of the formula:

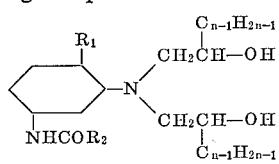

wherein $R_1$ is H or $OR_2$, and $R_2$ is an alkyl radical having 1–4 carbon atoms and $n$ has a value of 1–2. The hydroxy alkyl groups of the coupling component are reacted either before or after coupling with at least stoichiometric quantities of both (1) a strong carboxylic acid halide, e.g., the alkylchlorocarbonates, acylhalides, alkylsulfonylchlorides, arylsulfonylchlorides, thionylchloride and (2) a mono- or di-N-substituted lower alkyl formamide or acetamide at an elevated temperature of 30 to 100° C. until the reaction mixture is substantially free of unreacted coupling component.

The reacting product is a mixture that I have been unable to positively identify using any of the ordinary means of structural analysis; e.g., infrared, nuclear magnetic resonance, or elemental analysis. By melting point measurements and chromatography, as well as by performance, I have determined that the mono- or di-alkylformamide clearly takes part in the reaction.

Detailed description, description of preferred embodiment

The modification of the hydroxyalkyl groups of the 3 - N,N - dihydroxyalkyl acetanilide coupling component can be accomplished either before or after coupling. A coupling component modified prior to coupling is, of course, useful per se in the preparation of dyestuffs by merely coupling the modified component with any diazotized amine capable of coupling in an acid medium.

The coupling component may be modified according to the method of the invention by dissolving it in one of the designated amides, which is conveniently used in the reaction as a solvent as well as a reactant, and adding thereto at least a stoichiometric quantity (two moles based on the hydroxyalkyl groups in the coupler) and preferably a 25–50 percent excess over the stoichiometric amount, of the strong acid halide. The use of the amide as a solvent obviously provides the stoichiometric amount, based on the coupler, of N-substituted amide. It is possible, of course, although less convenient, to add the N-substituted amide in at least a stoichiometric quantity and conduct the reaction in an inert medium, such as t-butyl alcohol.

The reaction is run at a temperature between 30 and 100° C. and is continued for several hours until unreacted dihydroxyalkyl compound is substantially eliminated from the reaction mixture. The reaction time, of course, will vary with the temperature and for this reason it is preferable to use higher temperature of, for example, 60–100° C. to complete the reaction in a minimum amount of time. The degree of completion of the reaction can be determined easily by an examination of the product. If there is a substantial amount of dihydroxyalkyl component in the final product, the light fastness of the insufficiently reacted product, as determined by accelerated laboratory testing methods, is markedly inferior to a completely reacted product. The entry of the amide into the reaction facilitates the elimination of unreacted dihydroxyalkyl compound. To shorten the required reaction time, a tertiary amine acid-binding agent, such as trimethylamine, triethylamine, or pyridine, can be used in stoichiometric quantities to react with the hydrochloric acid given off during the reaction.

Thin - layer - chromatographic analysis was used to verify the fact that the dyestuffs prepared according to the method of my invention are complex mixtures. The thin-layer-chromatographic analysis technique separates the dyestuff into its various components. The technique employed was to first prepare a 5% solution of the dyestuff in acetone. Four (4) microliters of that solution was spotted on a glass plate on which had been previously cast a 250 micron layer of silica gel. After drying, the spot was eluted with a 4/1 by volume benzene/acetone solution. As the dyestuff spot migrates vertically up the plate the various components of the dyestuff separate. That is, depending upon its polarity, relative solubility, etc. in the elution liquid each component will migrate to a different height on the plate. In that manner, it was verified that dyestuffs prepared according to the method of my invention are complex mixtures. The chromatographs also showed that the amide definitely entered into the reaction and that the mixtures are of the same composition, regardless of which of the designated amides and other reactants are employed to modify the hydroxyalkyl groups of the coupling component.

The amides and strong acid halides useful in the method of my invention are for the most part commercially available chemical intermediates.

Suitable formamides and acetamides are N,N-dimethylformamide, N,N - dimethylacetamide, N,N - diethylacetamide, N,N - diethylformamide, N,N-di-t-butylformamide and N-mono-t-butylformamide.

Examples of suitable alkylchlorocarbonates useful in the process of my invention are ethylchlorocarbonate, methylchlorocarbonate and t-butylchlorocarbonate. Suitable carboxylic acylhalides are, for example, acetyl chloride, propionyl chloride, benzoyl chloride, and butyryl chloride. Illustrative of useful sulfonylchlorides are benezene sulfonylchloride, methane sulfonylchloride and t-butylsulfonylchloride.

As noted above, the coupling can be carried out either before or after the modification of the coupling component. The coupling reaction is carried out in the conventional manner at 0–5° C. in an aqueous acid medium, with or without the use of an acid-binding agent, such as sodium acetate. After the coupling reaction, the precipitated monoazo dyestuffs are filtered off and washed.

Of particular importance is a new class of blue monoazo dyestuffs prepared according to the method of my invention by reacting:

(a) a diazotized 1-amino-2,4-dinitro-6-halobenzene of the formula:

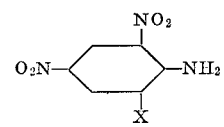

wherein X is Cl or Br, and
(b) a coupling component of the formula:

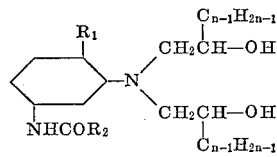

wherein $R_1$, $R_2$ and $n$ have the meanings aforesaid.

The hydroxyalkyl groups of the coupling component are reacted, either before or after coupling, with at least a stoichiometric quantity of an alkyl chlorocarbonate of the formula:

wherein R is an alkyl radical having from 1–5 carbon atoms, and at least stoichiometric quantities of a di-lower alkylformamide, such as dimethylformamide or diethylformamide, at an elevated temperature of 30–100° C.

until the reaction mixture is substantially free of unreacted coupling component.

Diazotization of the 1-amino-2,4-dinitro-6-halobenzene is carried out by methods known to the art for many years. Conveniently, the diazotizable amine is stirred to solution in concentrated sulfuric acid at 20–25° C. and nitrosyl sulfuric acid is added thereto to form the diazo compound, which is held for the coupling step.

Dyestuffs prepared according to my invention may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste is cut or standardized to a standard strength with a diluent, such as sodium sulfate or dextrin. As noted above, any conventional wetting agent, e.g., sodium cetyl sulfonate, may be added to wet out the product. The final color content of the finished paste averages from 10–40 percent by weight (pure color) active dyestuff base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25–60% by weight color content (Pure color).

The dyestuffs are applied by known methods for dyeing polyesters, either in a dispersion with a carrier at 50–100° C. or without a carrier at 100–150° C. under pressure. Printing and padding are carried out in the presence of suitable thickening agents followed by fixation at high temperatures with or without steam. The novel dyestuffs produce uniform shades over a temperature range of 180–220° C. when applied by the Thermosol® process.

The blue dyestuffs of the invention can also be blended or shaded with one or more orange components, preferably of the azo series, to produce dyeings ranging from greenish- to reddish-black, in a manner similar to that described in the co-pending application of Albert C. Rotcop and Herman P. Baumann, Ser. No. 525,842, filed Feb. 8, 1966, now U.S. Patent 3,413,705. Deep jet dyeings are obtained by increasing the amount of blue component in the formulation.

My invention is further illustrated by the following examples:

EXAMPLE I

A diazo solution was prepared by charging to a 500 ml. flask 200 g. 94 percent sulfuric acid and adding thereto at 20–25° C. 50 g. 1-amino-2,4-dinitro-6-bromobenzene. The mixture was stirred to solution and maintained at 20–25° C. There was then added dropwise 50 g. nitrosyl sulfuric acid below 25° C. The resulting diazo solution was stirred overnight at 20–25° C. and held for the coupling reaction.

To a separate 500 ml. flask there were charged 56.5 g. of 3-diethanolamino-4-ethoxyacetanilide (0.2 mole) and 85 g. of dimethylformamide.

The mixture was heated to 65–70° C. then cooled to 5–10° C. A 4 g. quantity of pyridine (about five percent, based upon the amount of dimethylformamide) was added thereto. At a temperature between 5 and 10° C. there was added dropwise 60 g. of ethyl chloroformate. After the addition of the ethyl chloroformate, the solution was allowed to come to room temperature and stirred overnight. It was then heated to 75° C., cooled to room temperature and poured into 1200 g. of ice and water containing 30 g. of 20° Baumé hydrochloric acid. To the resulting slurry there was added 275 g. of the above-prepared diazo solution at a temperature below 5° C. The reaction mixture was allowed to reach room temperature over a period of five hours. The product was separated by filtration, washed with cold water, reslurried in a one percent soda ash solution, and stirred at room temperature overnight. The slurry was filtered and washed in cold water to give a wet cake weighing 346.7 g. (30 percent solids). The product melted at 140–147° C. A thin-layer-chromatograph of the dyestuff showed it to have a complex mixture component. A dispersion was prepared containing 12.75 percent of the monoazo blue dye and 37.25 percent sodium lignin sulfonate dispersant together with a small amount of glycerin and enough water to bring the solids content of the solution to 50 percent by weight. The paste was then milled until the dyestuff was sufficiently dispersed.

An aqueous solution of one percent by weight of monosodium phosphate and twenty percent by weight, based on the weight of fabric dyed, of a commercially available phenolic carrier was prepared. The resulting solution was heated to 120° F. and 10 g. of Dacron polyester fabric was added thereto. The temperature was maintained for ten minutes and two percent by weight of the dyestuff paste prepared as described above was added to the bath. The resulting dye bath was heated at 208° F. and maintained at this temperature for ninety minutes. The dyed fabric was removed and after-soaped by working it in a one percent soap solution at 180° F. for ten minutes. It was then rinsed and dried. The dyed fabric appeared navy blue in color with a slightly reddish cast. The dyeing was characterized by excellent sublimation and very good light fastness. Dyeings were repeated at 4 and 8 percent with a proportional build up of color on the fabric.

EXAMPLE II 1-amino-2-dinitro-6-bromobenzene was diazotized as described in Example I. To a separate 500 ml. flask there were charged 100 cc. dimethylformamide and 56.5 g. 3-diethanolamino-4-ethoxyacetanilide (0.2 mole). The mixture was heated to 60–65° C. and then cooled. At 5–10° C. over a period of one hour there was added 44 g. ethyl chlorocarbonate (0.2 mole). The mixture was held at room temperature for six hours. 15 grams additional ethyl chlorocarbonate (33 percent excess) was added and the mixture was heated to 75° C. and held for one-half hour. The reaction mixture was drowned in 1200 g. ice water containing 30 g. 20° Baumé hydrochloric acid. The product was coupled as described in Example I by adding 260 g. diazo solution dropwise at 0–5° C. The reaction mixture was agitated overnight and the product was separated by filtration and washed with water. The press cake was reslurried with 50 g. soda ash, filtered, and washed with water at 50° C. There was thus obtained 387 g. wet cake having a solids content of 26 percent. The product melted at 157–160.5° C. Dyeings made according to the procedure of Example I showed that the product was characterized by excellent sublimation and good light fastness. The buildup on the fiber was proportional to the amount of dye in the bath.

EXAMPLE III

The procedure of Example II was substantially repeated with the exception that a fifty percent excess of ethyl chlorocarbonate was used and that the reaction mixture was heated at 100° C. for one-half hour. After coupling, the resulting product had a melting point of 145–146° C. The product was somewhat redder than that of Examples I and II, but the dyeing properties were comparable in every respect. A thin-layer-chromatograph of the dyestuff was the same as that of Example I.

EXAMPLE IV

By substituting diethylformamide for the dimethylformamide in the procedure of the preceding examples, a dyestuff of similar performance characteristics is obtained. An excellent dyestuff is also obtained by using 1-amino-2,4-dinitro-6-chlorobenzene as the diazo component.

EXAMPLE V

A dyestuff having excellent affinity, good light fastness, and excellent sublimation properties is prepared by using 3-diisopropanolamino-4-methoxyacetanilide as the coupling component.

EXAMPLE VI

To a 500 cc. flask equipped with mechanical agitator and thermometer was charged 150 cc. of N,N-dimethylformamide and 57 grams 3-diethanolamino-4-ethoxy-6-(2′,4′-dinitro-6′bromo)phenylazoacetanilide. The mixture was heated with stirring to 70 to 75° C., and then cooled to 10° C. To the mixture was added 4 cc. of pyridine followed by a dropwise addition of 25 grams ethylchlorocarbonate (theory=21.7 grams). The mixture was heated with stirring to 65–70° C. and held at that temperature for one hour, after which it was drowned into 500 cc. ice water, stirred, filtered, and washed substantially acid-free with cold water. The press cake was reslurried in 200 cc. of a 1% soda ash solution, filtered and washed with water. 134.5 grams wet press cake were obtained containing 54 grams of pure dyestuff melting at 170–175° C. The dyestuff was standardized in a manner similar to that of Example I and dyed on 10 grams of Dacron polyester fabric in a like manner as Example I. The dyed fabric was of the same shade and had similar properties to the dyestuff of Example I. The dyeing was characterized by excellent sublimation and very good light fastness and reserved cotton and wool in a mixed fabric dyeing. Thin layer chromatographic analysis showed the dyestuff to be the same as that of Example I.

EXAMPLE VII

The procedure of Example VI was repeated with the exception that 24 grams of methanesulfonylchloride was used in place of the ethyl chlorocarbonate. A blue dyestuff similar to that of Example VI with excellent properties was prepared. Thin-layer-chromatography showed the dyestuff to be the same as that of Example I.

EXAMPLE VIII

The procedure of Example VI was repeated with the exception that 39 g. benzene sulfonylchloride was used in place of the ethyl chlorocarbonate. Thin-layer-chromatographs showed the blue dyestuff to be the same as that of Example VI.

EXAMPLE IX

The procedure of Example VI was repeated with the exception that 27 grams of benzoylchloride was used in place of the ethyl chlorocarbonate. Thin-layer-chromatographs showed the blue dyestuff to be the same as that of Example VI.

EXAMPLE X

The procedure of Example VI was repeated with the exception that 25 grams of butyrylchloride was used in place of the ethyl chlorocarbonate. A thin-layer-chromatograph showed the blue dyestuff to be the same as that of Example VI.

EXAMPLE XI

The procedure of Example VI was repeated with the exception that 27 grams of thionyl chloride were used in place of the ethylchlorocarbonate. Thin-layer-chromatographs showed that the blue dyestuff prepared was the same as that of Example VI.

EXAMPLE XII

The procedure of Example I was repeated with the exception that 200 cc. of N,N-dimethylacetamide was used in place of the N,N-dimethylformamide. A blue dyestuff with properties similar in every respect to that of Example I was prepared. Thin-layer-chromatographs showed the dyestuff to be the same as that of Example I.

EXAMPLE XIII

The procedure of Example I was repeated with the exception that 150 cc. of N-t-butylformamide was used in place of the N,N-dimethylformamide. Thin-layer-chromatographs showed the blue dyestuff to be the same as that of Example I.

EXAMPLE XIV

The procedure of Example I was repeated with the exception tha 150 cc. of N,N-di-t-butylformamide was used in place of the N,N-dimethylformamide. Thin-layer-chromotographs showed the dyestuff to be the same as that of Example I.

EXAMPLE XV

The following dyestuffs were prepared by coupling the various listed amines diazotized in a conventional manner into a coupling component prepared as in Example I, except where indicated otherwise.

| Amine | Coupling component | Shade on polyester fiber |
|---|---|---|
| $O_2N$—⟨ring, CF$_3$⟩—$NH_2$ | As Example I | Red-violet. |
| $NC$—⟨ring⟩—$NH_2$ | do | Bluish-scarlet. |
| $O_2N$—⟨ring, COOCH$_3$⟩—$NH_2$ | do | Red. |
| $CH_3O_2S$—⟨ring⟩—$NH_2$ | do | Rubine. |
| $O_2N$—⟨ring, Br, Cl⟩—$NH_2$ | do | Bluish-red. |

| Amine | Coupling component | Shade on polyester fiber |
|---|---|---|
| $O_2N-\underset{NO_2}{\overset{CN}{C_6H_2}}-NH_2$ | ___do___ | Navy blue. |
| $NH_2O_2S-C_6H_4-NH_2$ | ___do___ | Orange. |
| $O_2N-\overset{SO_2NH_2}{C_6H_3}-NH_2$ | ___do___ | Violet. |
| $CN-\underset{CN}{\overset{Br}{C_6H_2}}-NH_2$ | ___do___ | Navy blue. |
| $CH_3-\overset{O}{\underset{}{C}}NH-C_6H_4-NH_2$ | ___do___ | Orange. |
| $O_2N-\underset{NO_2}{C_6H_3}-NH_2$ | ___do___ | Blue. |
| $O_2N-\overset{}{\underset{CN}{C_6H_3}}-NH_2$ | ___do___ | Violet. |
| $O_2N-\overset{SO_2CH_3}{C_6H_3}-NH_2$ | ___do___ | Bluish-scarlet. |
| $O_2N-\underset{Cl}{\overset{Cl}{C_6H_2}}-NH_2$ | ___do___ | Violet. |
| $NC-\underset{CN}{C_6H_3}-NH_2$ | 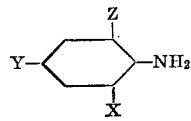 | Red. |
| $O_2N-\underset{Cl}{C_6H_3}-NH_2$ | Same as above | Orange. |

I claim:

1. The monoazo dyestuff consisting essentially of the reaction product of:
(a) a diazotized arylamine of the formula:

$$Y-\underset{X}{\overset{Z}{C_6H_2}}-NH_2$$

wherein X is $NO_2$, Cl, Br, H, $SO_2$-lower alkyl, $SO_2NH_2$, CN, COO-lower alkyl, or $CF_3$; Y is $NO_2$ or CN; Z is HCl, Br, $NO_2$, or CN, and
(b) a coupling component of the formula:

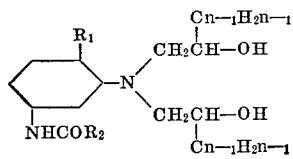

wherein $R_1$ is H or $OR_2$ and $R_2$ is an alkyl radical having 1–4 carbon atoms and $n$ has a value of 1–2, the hydroxyalkyl groups being reacted with at least stoichiometric quantities of both:
   (1) a compound selected from the group consisting of lower alkyl chlorocarbonates, carboxylic acyl chlorides having up to 6 carbon atoms, lower alkyl sulfonylchlorides, and phenyl sulfonylchlorides, and
   (2) a mono- or di-lower alkyl formamide or acetamide, at a temperature of 30–100° C. until the reaction mixture is substantially free of unreacted coupling component.

2. The dyestuff of claim 1 wherein the compound is ethylchlorocarbonate and the formamide is dimethylformamide.

3. The dyestuff according to claim 2 wherein the di-lower alkylformamide is dimethylformamide.

4. A dyestuff according to claim 3 wherein the reaction is conducted in the presence of a tertiary amine acid-binding agent.

5. The monoazo dyestuff consisting essentially of the reaction product of:
(a) a diazotized 1-amino-2,4-dinitro-6-halobenzene of the formula:

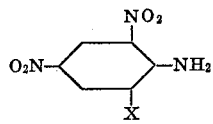

wherein X is chlorine or bromine, and
(b) a coupling component of the formula:

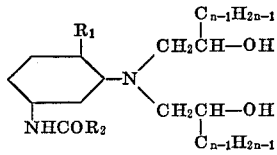

wherein $R_1$ is H or $OR_2$ and $R_2$ is an alkyl radical having from 1-4 carbon atoms and $n$ has a value of 1-2, the hydroxyalkyl groups of said coupling component being reacted with at least stoichiometric quantities of an alkyl chlorocarbonate of the formula:

wherein R is an alkyl radical having from 1-5 carbon atoms, and a di-lower alkyl formamide at a temperature of 30-100° C. until the reaction mixture is substantially free of unreacted coupling component.

6. A dyestuff according to claim 5 wherein said coupling component is reacted with said lower alkyl chlorocarbonate and dimethylformamide at a temperature of 60-100° C.

7. A dyestuff according to claim 5 wherein the diazotized 1-amino-2,4-dinitro-6-halobenzene is 1-amino-2,4-dinitro-6-bromobenzene, the coupling component is 3-diethanolamino-4-ethoxyacetanilide, and the lower alkyl chlorocarbonate is ethyl chlorocarbonate.

References Cited

UNITED STATES PATENTS

| 2,249,749 | 7/1941 | Dickey et al. | 260—207.1 X |
| 2,741,659 | 4/1956 | Schmid et al. | 260—174 |
| 3,178,405 | 4/1965 | Merian | 260—207 |
| 3,268,507 | 8/1966 | Kruckenberg | 260—207 |

CHARLES B. PARKER, Primary Examiner

C. F. WARREN, Assistant Examiner

U.S. Cl. X.R.

8—26, 41; 260—207.1, 456, 463, 470